INVENTORS.
PAUL L. TERWILLIGER
FRANCIS M. SMITH

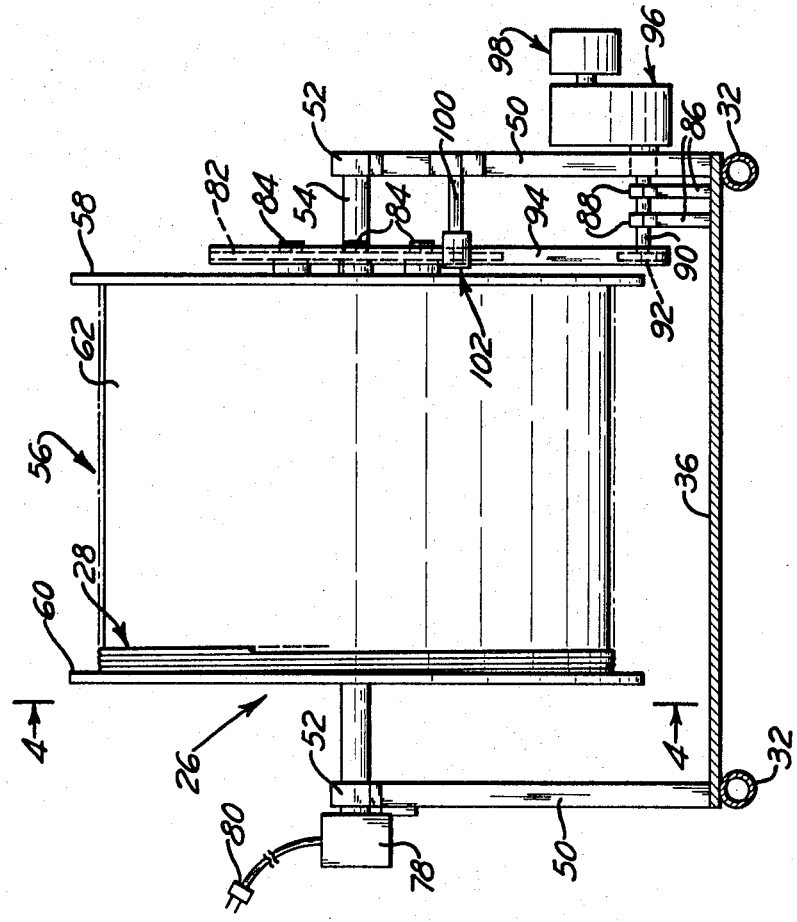
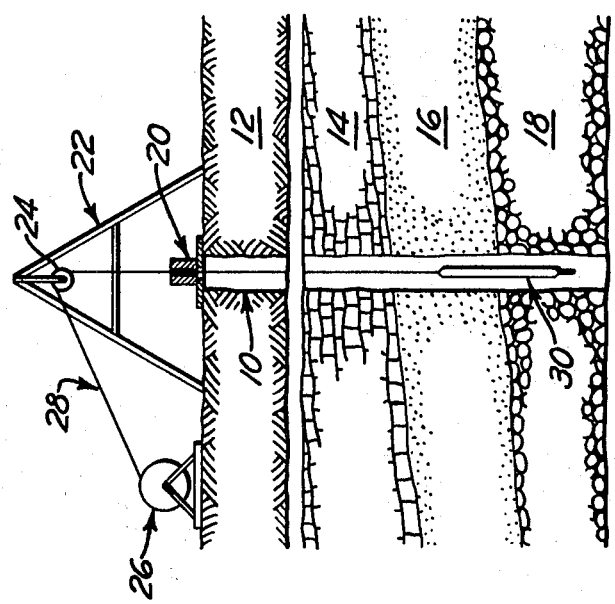
Fig. 3
Fig. 1
INVENTORS.
PAUL L. TERWILLIGER
FRANCIS M. SMITH

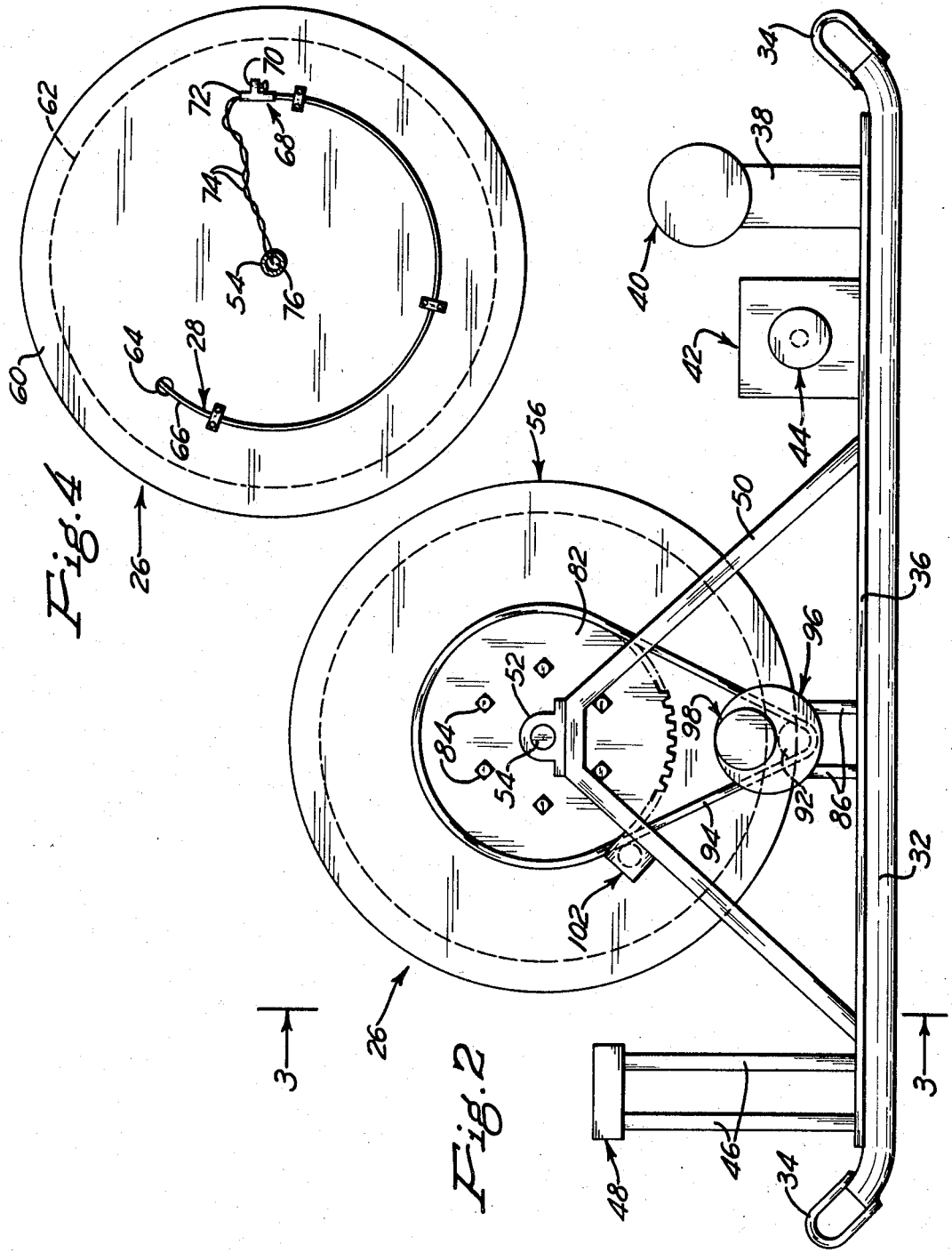

United States Patent Office 3,443,429
Patented May 13, 1969

3,443,429
**APPARATUS FOR WELL TREATMENT
AND MEASUREMENT**
Paul L. Terwilliger, Fox Chapel, and Francis M. Smith,
Gibsonia, Pa., assignors to Gulf Research & Development Company, Pittsburgh, Pa., a corporation of
Delaware
Filed Jan. 9, 1967, Ser. No. 608,134
Int. Cl. E21b 49/00
U.S. Cl. 73—152                             10 Claims

ABSTRACT OF THE DISCLOSURE

Apparatus is provided to take continuous temperature traverses through a well with means to record the temperatures at the surface. Thermocouple wires of long length are placed through a long length of Monel tubing with the aid of a Teflon coating on the thermocouple pair, and this combination permits the ease of a wire line operation. The invention encompasses measuring other downhole phenomena.

---

This invention relates to methods and apparatus for measuring various phenomena in a well, such as flows, pressure or temperature, and to record the readings on the surface. The apparatus utilizes a long length of Monel tubing, on the order of 5,000 feet, in which there is a pair of wires. The wires are assembled into the tubing by means of a Teflon coating over the wires, which permits their being pulled through the long length of tubing.

The invention is particularly useful in taking temperature traverses or logs of a well while recording the temperature readings continuously and instantaneously at the surface.

Down-hole temperature measuring devices previously available fall into three general classes; wire-line devices; thermocouple wires sheathed with stranded steel cable; and surface recording down-hole temperature measuring devices. All of these prior devices have disadvantages overcome by the present invention.

Wire-line devices usually operate with a down-hole temperature recording instrument. With such down-hole recording instruments, records can be obtained only for relatively short periods of time, and the results are available only after this time has expired when the instrument is raised out of the hole and its record removed. Hence, these devices provide only intermittent readings, are usually rated at less than 250° F. and are relatively expensive. There is a substantial time delay between the time the temperatures are recorded and the time the record is read.

Thermocouple wires sheathed with flexible stranded steel cable provides the advantage of continuous and instantaneous measurement, but suffer from the disadvantage of the great difficulty of making a seal between the cable and the well head equipment, which problem becomes even greater when a traverse of the well is attempted. The lack of the fluid tight seal causes breakdown in the cable and results in short circuits of the wires. At high temperatures the stranded steel cable loses strength and may break, resulting in an extensive loss of cable and an expensive "fishing" job to clean the well.

The third prior class utilize surface recording down-hole measuring devices, but run the single wire or the wires on the outside of oil well tubing. These devices are very seldom used because any malfunction requires the use of a rig to pull the tubing to make repairs. Also, it is not feasible to make temperature traverses with this type of equipment.

In the present invention, a thermocouple pair having a length of the order of 5,000 feet is prepared, and the wires are coated with a wrapped and fused layer of Teflon. A tubing of flexible, noncorrosive and relatively strong material of substantially equal length is used to carry the thermocouple wires and junction down to the zone in which the temperature is to be measured. Monel is one metal particularly suitable for use in the invention, to assemble the coated wires into the tubing, the tubing is laid out straight, and a plug of nylon or similar material to which is attached a nylon monofilament line is blown through the tubing by means of high pressure gas. The previously prepared length of Teflon sheathed thermocouple wires is then attached to one end of the nylon monofilament line, and pulled through the tubing. The Teflon permits the assembling of the thermocouple pair into the tubing. Heretofore, it was not possible to assemble lengths of thermocouple wires in flexible tubing of these orders of magnitude because the friction drag on the wires as they were pulled through the tubing would increase as the length of the wire in the tubing increased, and would break the wires before the entire length was pulled through.

The apparatus of the invention also comprises a unitized self-contained reel device to raise and lower the tubing in the well to make traverses or logs through the well. The apparatus of the invention can also be used to make traverses or logs of other phenomena by simply attaching other devices to the down-hole end of the tubing, such as a pressure sensing head or flow measuring device.

In the accompanying drawing forming a part of this disclosure:

FIG. 1 is a diagrammatic vertical cross-sectional view through a well in the earth showing the invention in use and set up to take a temperature survey;

FIG. 2 is a side elevational view of the reel with some parts omitted for the sake of clarity;

FIG. 3 is a cross sectional view taken on line 3—3 of FIG. 2;

FIG. 4 is a cross sectional view taken on line 4—4 of FIG. 3;

Figure 6:
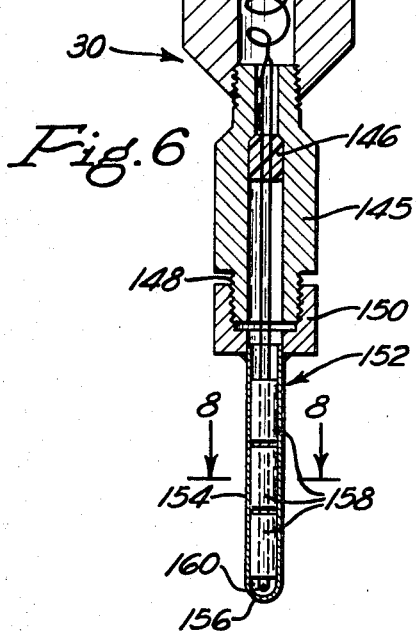
Figure 7:
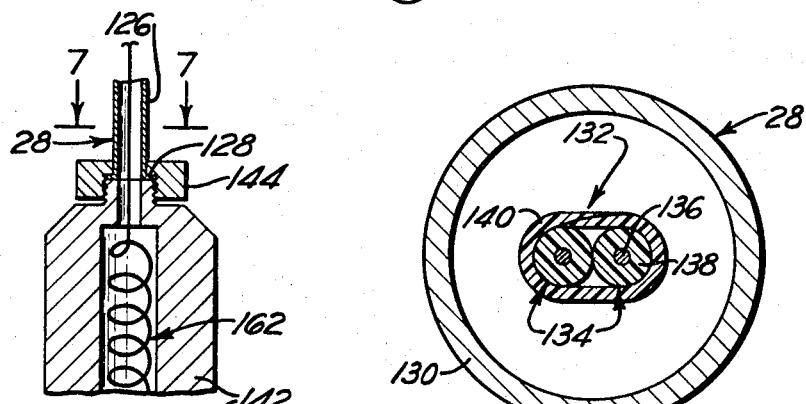
Figure 8:
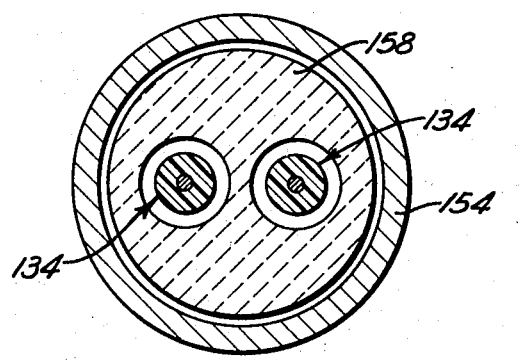

FIG. 6 is a vertical cross sectional view of the temperature sensing head shown in FIG. 1; and FIGS. 7 and 8 are cross sectional views taken on lines 7—7 and 8—8 of FIG. 6, respectively.

Referring now in detail to the drawing, in FIG. 1 there is shown a well bore 10 passing through a number of different formations 12, 14, 16 and 18. The top of the well bore at the surface is closed and sealed by conventional equipment 20 (shown diagrammatically), but it will be understood that wellhead equipment 20 includes the usual stuffing box and wellhead lubricator. Mounted over well 10 is an A frame 22, or other suitable support carrying a pulley 24. Beside A frame 22 on the surface of the earth is a reeling machine 26, described more in detail below.

As shown in FIG. 1, the apparatus of the invention is set up to take a temperature traverse or log through well 10. Wound upon the reel of reel machine 26 is a continuous length of tubing and thermocouple wire assembly 28. Assembly 28 extends over pulley 24 down through the stuffing box and wellhead lubricator in wellhead equipment 20, and terminates in a sinker bar and sensing head assembly 30, shown more in detail in FIGS. 6 through 8 and described below.

By use of the invention, continuous logs of temperature, or other phenomena within the well, depending on the nature of the sensor head, are made at the surface by moving the sinker bar and sensor head assembly 30 through the well and continuously recording the readings sensed by the sensing means at the surface through means provided in reel machine 26.

Referring now to FIGS. 2 through 4, reel machine 26 comprises a pair of longitudinal tubular support members or skids 32 provided with pulling hooks 34 at each end. Mounted on the two support members 32 is a main plate 36, on which is mounted the remainder of the components comprising reel machine 26. Thus, there is provided a portable self-contained unitized reel machine easily moved by means of hooks 34 and supports 32 from one location to another.

Figure 5:
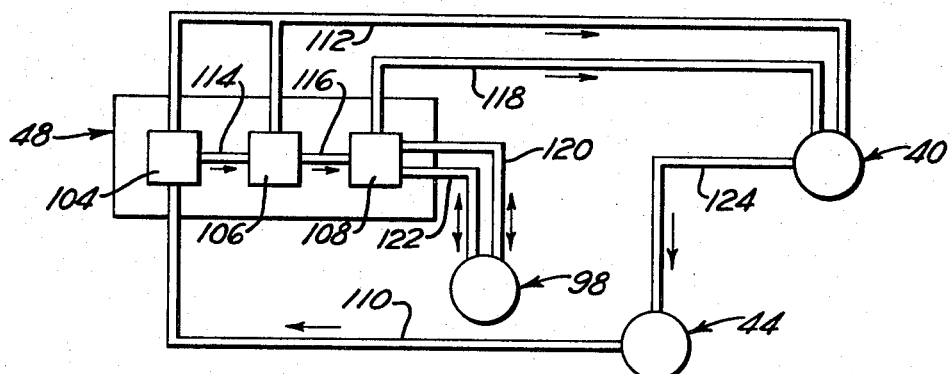
FIG. 5 is a schematic drawing of the hydraulic system of the reel of FIGS. 2 to 4.

The drive for the reeling machine is hydraulic, the hoses and interconnections being omitted in FIGS. 2 and 3, but shown in the schematic diagram of FIG. 5. The various connections between structural elements of machine 26 may be made by welding, nuts and bolts, or any other suitable means. Mounted on plate 36, by means of support 38, is a surge or sump tank 40. Plate 36 also carries a power source which may comprise a small gasoline engine 42. Suitably mounted on the output shaft of engine 42 is a hydraulic pump 44. At the opposite end of main plate 36 are support members 46 which carry a control box or console 48.

Between the control box 48 on one end, and the engine, pump, and tank group on the other end, plate 36 carries a pair of reel supporting frames 50 each carrying a bearing or pillow block 52 in which are mounted reel shaft 54. Reel shaft 54 carries a reel 56 which comprises a pair of side plates 58 and 60, between which is mounted a cylindrical drum member 62, on which is wound thermocouple and tubing assembly 28. Reel side plate 60 is formed with a small opening 64 through which passes the inner end 66 of assembly 28. The end connection on end portion 66 comprises a Y fitting 68, comprising a fluid connection arm 70 and an electrical connection arm 72 through which pass the upper end portions 74 of the thermocouple wires, which may be the thermocouple wires themselves, or may be added on leads. By means of fluid connection arm 70 in Y fitting 68 the assembly 28 can be used to carry both electrical signals by way of the wires 74 and a fluid through the annulus between the inside of the tubing and the wires. A suitable fluid tight seal is provided at the outer end of electrical arm 72.

Reel shaft 54, which preferably comprises a hollow pipe, is provided with a small opening 76 through which wires 74 pass. Wires 74 go through hollow reel shaft 54 and out to electrical connection box 78 provided with any suitable electrical take-off means, such as electric brushes and rotating commutators, to transmit the signals carried up to the surface. A quick connection plug 80 is provided so that the apparatus may be connected to any suitable recording means, not shown, such as a continuous strip chart recorder.

The opposite side plate 58 is provided with a main driving gear or sprocket 82 held in place thereon by any suitable means such as bolt and stand-off assemblies 84. Means are provided to utilize the hydraulic fluid pumped by pump 44 to drive reel 56 via main gear 82. To this end main plate 36 carries support means 86, carrying pillow blocks or bearings 88 which rotatably mount a shaft 90 carrying a drive sprocket 92 coplanar with main drive gear 82. A suitable drive chain 94 interconnects sprocket 92 and main gear 82. The other end of shaft 90 extends outwardly of the associated reel support 50 and extends into a speed reducer 96 fixed against rotation with respect to shaft 90 by any suitable means. The input side of speed reducer 96 is connected to a hydraulic motor 98 fixed with respect to the rotation of the input shaft.

Means are provided to count the revolutions of reel 56 to determine the length of assembly 28 which has been played out. To this end a support 100 mounted on reel support 50 carries a counter 102 having a gear in engagement with drive chain 94. By suitable calibration, counter 102 may be made to read out directly in length of assembly 28 played out.

In FIG. 5 there is shown a schematic diagram of the hydraulic system of reel machine 26. Mounted within or adjacent to control console 48 are three controls 104, 106, 108. The flow direction of the hydraulic fluid within the system is indicated by the arrow heads on the various lines in FIG. 5. A line 110 runs from the output side of pump 44 to one side of control 104. Control 104 is an automatic back pressure bypass which acts as a safety by shunting the fluid back to sump 40 through a line 112 if it should be delivered through control 104 at a pressure high enough to damage any part of the system. Under normal conditions, however, control 104 permits passage of the pressurized fluid through a conduit 114 into one side of control 106. Control 106 is a manually operated bypass valve used to control the speed of motor 98. By selective adjustment of control 106 by the operator, more or less of the pressurized fluid is directed either into shunt 112 or to feed line 116 into control 108. Control 108 is a three position flow direction control, having reel forward, reel reverse, and neutral positions. In the neutral position, all of the pressurized hydraulic fluid is passed into a line 118 and fed back into sump 40. A pair of lines 120 and 122 interconnect control 108 and motor 98. Each of the flow lines 120 and 122 passes fluid in either direction dependent upon whether control 108 is the reel forward or reel reverse position, and by switching said control the direction of rotation of the reel can be reversed. The hydraulic system is completed by a feed line 124 connecting sump 40 to the input side of pump 44.

Referring now to FIGS 6 through 8, the sinker bar and sensor head assembly 30 is shown in detail. The downhole end 126 of assembly 28 is connected to assembly 30 by means of a compression sleeve 128 joined to end 126.

Referring to FIG. 7, assembly 28 comprises a tubing 130 which is flexible, heat resistant, and strong enough to carry the weight of sinker bar and sensor head assembly 30. One material found particularly suitable for fabricating tubing 30 is Monel. The use of the Monel tubing with its smooth outer surface solves the problem of maintaining a seal at the well head while permitting a traverse of the well. Within Monel tubing 130 is a thermocouple wire assembly 132, comprising a pair of thermocouple wires 134. Each thermocouple wire 134 comprises an inner core 136 surrounded by insulation 138. As is well known, the two conductors 136 are made of two different materials so that their joint will produce a flow of electrons when it is heated. One suitable pair of materials for use in the present invention as wires 136 are Chromel and Alumel. Any other two thermocouple wire materials may be used. Surrounding the two thermocouple wires 134 is a sheath 140, which comprises a wrapped coating of a strip of Teflon which has been fused. Coating 140 is available in both wrapped and extruded forms, but the extruded form is not suitable for use in the invention because it has less flexibility than the wrapped and fused form. The entire assembly 140 and 134 is commercially available, and is sold by the Thermo Electric Company, Inc. of Saddle Brook, N.J.

With the use of the following method, it is possible to fabricate lengths of thermocouple wires and tubing assembly on the order of magnitude of 5,000 feet. A plug of nylon or similar material to which is attached one end of a thin, strong line, such as monofilament nylon line, is blown through a straight length of tubing by means of a high pressure gas. The predetermined long length of tubing is laid out on the ground and stretched for this operation. The other end of the monofilament nylon line is attached to one end of the thermocouple wire and coating assembly, and the assembly is drawn through the tubing by means of the nylon line. The provision of the Teflon coating 140 makes it possible to draw a length of thermocouple wire assembly of these orders of magnitude through the tubing, which could not be done heretofore.

Sinker bar and sensor head assembly 30 comprises a sinker bar 142 of usual construction and may comprise a length of steel pipe of predetermined length which is filled with lead or other heavy material to increase its weight. Sinker bar 142 is formed with a central opening through which pass the thermocouple wires. The upper end of sinker bar 142 is internally threaded for cooperation with a threaded portion of tubing fitting 144 which cooperates with compression sleeve 128 to form a pressure tight seal between the upper end of the sinker bar and the lower end 126 of assembly 28, in the usual manner. The lower end of sinker bar 142 is internally threaded for cooperation with the upper end of a two-hole sealing fitting 145. Fitting 145 is provided with a two-hole fluid seal 146 to seal around the thermocouple wires 134. The fitting 145 and seal 146 are commercially available items, one manufacturer being the Conax Corporation of Buffalo, N.Y.

Fitting 145 is provided with an externally threaded lower end nipple 148 which mates with suitably formed internal threads on a nut 150 forming part of sensor head assembly 152. The threaded joint between nut 150 and nipple 148 is made to be fluid tight by any suitable means such as pipe threads. Sensor head assembly 152 comprises a relatively short piece of tubing 154 sealed at its lower end as at 156, and provided with a plurality of two-hole ceramic sleeves 158, see FIG. 8. Below the lowermost ceramic sleeve 158 and within sealed end 156, the thermocouple wires 134 are stripped of their insulation 138 and joined together as by welding or soldering to form a thermocouple junction 160. The upper end of tubing 154 is joined to the lower end of nut 150 by welding or other suitable means.

To accommodate the differential stretch between thermocouple wire assembly 132 and the tubing 130, which is caused by the difference in coefficients of thermal expansion between the tubing and the thermocouple wires as well as the differences in physical strength between them, an extra length 162, on the order of 30 feet or more of the thermocouple wire assembly 132, is coiled up in the hollow space in sinker bar 142.

The wrapped and fused coating 140 is stripped off of the two thermocouple wires 134 as the wires enter fitting 145.

The two separate wires are kept apart from each other in fitting 145 by the ceramic sleeves 158 and coatings 138 to insure that the only thermocouple junction is located at 160.

As will be readily apparent to one skilled in this art, logs of other down-hole phenomena such as pressure or flow can be taken by substitution of a suitable sensing head in place of temperature sensing head 152. In such case, the thermocouple wires 134 would be utilized as ordinary conductors; the thermocouple joint being omitted.

As shown in the drawing, the apparatus is set up to take a temperature log of a well, and to continuously record the temperature readings as the log is made by connecting any suitable recording means to the upper end of the thermocouple wires 134 via connection box 78 and plug 80. Such logs are particularly useful in certain well treatment methods such as steam injection, in-situ combustion, and fluid movement profiles.

In steam injection projects, a temperature survey could be made in an injection well, a producing well, and/or in an observation well. In the injection well, the thermocouple would be run to the bottom of the hole to check that the heat carried by the steam is going all the way down to the bottom. If the temperature at the bottom is less than that of the steam, the operators are made aware of the fact that at some level the heat carried by the steam is going into the formation, or that heat losses are severe. A traverse could then be made to locate that level if desired, or heat loss preventive measures applied.

In a producing well, the sinker bar and sensor head assembly 30 can be run in the annulus to the producing zone to indicate at what level in the producing zone the heat is leaving the formation and at what temperature. This information is valuable if it should be desired to increase production by re-steaming the injection well.

In a steam flood of a field or a part of a field, the invention could be run in one of the producing wells to show where the oil is being produced from, and also to show a break through of the steam if it should occur.

In an in-situ combustion project, the apparatus of the invention could be run into an injection well, a producing well, and/or observation well.

In an injection well, the thermocouple would be run to the bottom of the hole to determine the temperature and depth at which the injected gas is entering the formation.

In a producing well, the thermocouple assembly would be run to the bottom of the hole and a temperature traverse made to determine the level in the producing zone at which hot fluids were leaving the formation. The thermocouple could be left in the well for extended periods for temperature monitoring. Arrival of a combustion front at the producing well could be recorded and/or production of excessively hot fluids stopped before well damage resulted.

This same method would be used in observation wells to determine combustion zone characteristics.

While the invention has been described in some detail above, it is to be understood that this detailed description is by way of example only, and the protection granted is to be limited only within the spirit of the invention and the scope of the following claims.

We claim:

1. Apparatus for making a survey of a well, comprising sensor means, means to raise and lower said sensor means in said well from the surface of the earth, said raising and lowering means comprising an elongated continuous length of smooth walled flexible tubing and reel means adopted to reel and unreel said tubing, a pair of signal conductors within said tubing through substantially the entire length thereof, and means to continuously record signals transmitted by said sensor means to the surface via said conductors while said sensor means are in motion in the well.

2. The apparatus of claim 1, means binding said pair of conductors together over substantially the entire length thereof, said binding means comprising a wrapped and fused coating of Teflon.

3. The apparatus of claim 1, said reel means comprising a self-contained power driven reeling assembly, said assembly comprising a base plate, a power source mounted on said base plate, a hydraulic pump driven by said power source, a reel on which said tubing is wound, means to rotatably mount said reel on said base plate, a two-way reversible hydraulic motor, drive means connecting said motor and said reel, control means interconnecting said pump and said motor, said control means comprising a first control to bypass an excessively high pressure back to said pump, said control means comprising a second control in series connection with said first control and adapted to control the speed of flow of said hydraulic fluid therethrough, and said control means comprising a third control in series connection with said second control and adapted to control the direction of flow of said pressurized hydraulic fluid to said hydraulic motor.

4. The apparatus of claim 1, said sensor means comprising a combined sinker bar and sensor head assembly, means to attach the upper end of said sinker bar to one end of said tubing, means to attach said sensor head to the lower end of said sinker bar, means binding said pair of conductors together over substantially the entire length thereof, said binding means comprising a wrapped and fused coating of Teflon, said sinker bar being formed with a central, longitudinal, hollow chamber, and a length of said conductors longer than the length of said sinker bar within said hollow chamber.

5. The apparatus of claim 4, said signal conductors comprising a pair of electrical conductors formed of two dissimilar materials, and means to join the down-hole ends of said conductors together to form a thermocouple junction.

6. The apparatus of claim 5, said sensor head comprising a length of tubing sealed at its lower end, a ceramic sleeve within said length of tubing, said sleeve being formed with a pair of openings each receiving one of said electrical conductors, and said thermocouple junction being positioned below said sleeve and within said sealed lower end.

7. The apparatus of claim 1, said tubing consisting of Monel.

8. The apparatus of claim 1, said raising and lowering means comprising sinker means on the lower end of said tubing to cause a gravity driven lowering of said sensor means into said well.

9. Apparatus for making a survey of a well, comprising reel means, a continuous length of smooth walled flexible tubing wound on said reel means, means to reel and unreel said flexible tubing from said reel means to raise and lower one end of said tubing in said well, sensor means on said one end of said tubing, a pair of electrical conductors within substantially the entire length of said tubing and extending to said sensor means at said one end of said tubing, said electrical conductors extending outwardly of the other end of said tubing on said reel means, and means to record signals transmitted from said sensor means through said conductors and to said reel means while said reel means are in motion.

10. In an apparatus for taking a temperature survey of a well, the combination comprising a sensor head assembly, said sensor head assembly comprising an elongated sinker bar formed with an enlarged axial through opening, an adapter at the lower end of said sinker bar, said adapater being formed with a longitudinal through opening communicating with the longitudinal through opening in said sinker bar, a sensing head at the lower end of said adapter, said sensing head comprising a length of tubing, said tubing being sealed at its lower end, means to communicate the space within said tubing with the opening in said adapter, a thermocouple junction at the sealed lower end of said tubing; a pair of thermocouple leads extending from said thermocouple junction through the central openings in said tubing, said adapter, and said sinker bar; spacer means in said tubing adapted to hold said thermocouple leads in spaced relation to each other and to said tubing, a length of said thermocouple leads longer than the length of said sinker bar within said enlarger longitudinal opening in said sinker bar, means to move said sensor head assembly through a well, means to communicate signals between said thermocouple junction and surface equipment, said moving means comprising a continuous smooth walled flexible tubing, means to attach the lower end of said tubing to the upper end of said sinker bar with the longitudinal opening in said sinker bar in communication with the space within said tubing, said communicating means comprising extensions of said thermocouple leads extending upwardly from said sinker bar and through said tubing to the top of said well, said tubing comprising Monel, and a wrapped and fused coating of Teflon around said thermocouple leads.

References Cited

UNITED STATES PATENTS

| | | | |
|---|---|---|---|
| 2,290,075 | 7/1942 | Schlumberger | 73—154 |
| 2,463,427 | 3/1949 | Richards | 73—359 |
| 2,653,990 | 9/1953 | Brant. | |
| 2,945,265 | 7/1960 | Sell et al. | |
| 3,007,988 | 11/1961 | Jaffe et al. | 73—359 X |
| 3,202,754 | 8/1965 | Ruch | 174—37 X |
| 3,307,401 | 3/1967 | Bachman | 73—359 |

JAMES J. GILL, *Primary Examiner.*

JERRY W. MYRACLE, *Assistant Examiner.*

U.S. Cl. X.R.

174—68